United States Patent
Jang

(10) Patent No.: US 12,431,995 B2
(45) Date of Patent: Sep. 30, 2025

(54) ELECTRONIC DEVICE AND CONTROL METHOD THEREOF

(71) Applicant: SAMSUNG ELECTRONICS CO., LTD., Suwon-si (KR)

(72) Inventor: Jinhwa Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 438 days.

(21) Appl. No.: 17/971,380

(22) Filed: Oct. 21, 2022

(65) Prior Publication Data

US 2023/0044827 A1 Feb. 9, 2023

Related U.S. Application Data

(63) Continuation of application No. PCT/KR2021/001982, filed on Feb. 16, 2021.

(30) Foreign Application Priority Data

Apr. 24, 2020 (KR) .................. 10-2020-0050223

(51) Int. Cl.
*H04H 40/27* (2008.01)
*H04N 21/482* (2011.01)

(52) U.S. Cl.
CPC .......... *H04H 40/27* (2013.01); *H04N 21/482* (2013.01)

(58) Field of Classification Search
CPC ........ H04H 40/27; H04H 60/25; H04H 60/41; H04N 21/482; H04N 21/4586;
(Continued)

(56) References Cited

U.S. PATENT DOCUMENTS 8,120,712 B2 * 2/2012 Sakai .................. H04N 21/426
  725/38
9,681,183 B1 * 6/2017 Majid ................ H04N 21/4122
(Continued)

FOREIGN PATENT DOCUMENTS

JP 2006-197166 7/2006
JP 2011-124816 6/2011
(Continued)

OTHER PUBLICATIONS

International Search Report for PCT/KR2021/001982 dated Jun. 11, 2021, 5 pages.
(Continued)

*Primary Examiner* — Fernando Alcon
(74) *Attorney, Agent, or Firm* — NIXON & VANDERHYE P.C.

(57) ABSTRACT

An electronic device may include an interface unit, and a processor for storing information related to a plurality of broadcast channels that can be received through the interface unit, receiving a user input for selecting a channel number, identifying, on the basis of the stored information related to the plurality of broadcast channels, a broadcast standard corresponding to the selected channel number if a broadcast signal of a channel corresponding to the channel number selected according to the user input is not received, processing the frequency band of the broadcast signal corresponding to the selected channel number according to the identified broadcast standard, and controlling so that the stored information related to the plurality of broadcast channels is updated according to a processing result.

15 Claims, 10 Drawing Sheets

(58) Field of Classification Search
CPC .. H04N 21/4383; H04N 7/01; H04N 21/6112; H04N 21/6143; H04N 7/0127
See application file for complete search history.

(56) References Cited

U.S. PATENT DOCUMENTS

| | | | |
|---|---|---|---|
| 10,623,820 | B1 | 4/2020 | Desmond |
| 2005/0073614 | A1 | 4/2005 | Yukiyoshi |
| 2006/0168638 | A1* | 7/2006 | Yang .................. H04N 21/4384 348/E5.005 |
| 2007/0067803 | A1 | 3/2007 | Mears et al. |
| 2009/0098842 | A1 | 4/2009 | Jang |
| 2010/0162323 | A1* | 6/2010 | Kitazato .................. H04N 5/50 348/731 |
| 2010/0302461 | A1* | 12/2010 | Lim ..................... H04N 21/488 715/705 |
| 2013/0044996 | A1* | 2/2013 | Bhogal .................... H04N 9/79 386/326 |
| 2013/0145395 | A1 | 6/2013 | Jeong et al. |
| 2013/0314607 | A1* | 11/2013 | Williams ............... H04H 40/18 348/731 |
| 2015/0046950 | A1 | 2/2015 | Lee et al. |
| 2015/0172753 | A1* | 6/2015 | Yu ........................ H04N 21/426 725/56 |
| 2015/0195617 | A1* | 7/2015 | Kwak .............. H04N 21/64322 725/110 |
| 2016/0063949 | A1* | 3/2016 | Tsuchida .................. G09G 5/02 345/590 |
| 2016/0142744 | A1* | 5/2016 | Hirota ............ H04N 21/234363 725/54 |
| 2016/0212472 | A1* | 7/2016 | Shirasuka .......... H04N 21/4394 |
| 2016/0353134 | A1* | 12/2016 | Panje .................. H04N 21/426 |
| 2017/0353744 | A1* | 12/2017 | Kunisetty ............ H04N 21/266 |
| 2018/0014062 | A1* | 1/2018 | Turi .................... H04N 21/482 |
| 2018/0048930 | A1* | 2/2018 | Chou ................. H04N 21/6118 |
| 2018/0167694 | A1 | 6/2018 | Kim et al. |
| 2018/0262709 | A1* | 9/2018 | Jang .................. H04N 21/4384 |
| 2019/0166326 | A1 | 5/2019 | Park et al. |
| 2019/0261243 | A1* | 8/2019 | Amini .................. H04L 1/0033 |
| 2021/0067185 | A1* | 3/2021 | Kang .................. H04B 17/391 |
| 2023/0328319 | A1* | 10/2023 | Sugiura ............. H04N 21/4532 |

FOREIGN PATENT DOCUMENTS

| | | |
|---|---|---|
| KR | 10-2005-0024741 | 3/2005 |
| KR | 10-2006-0061956 | 6/2006 |
| KR | 10-2007-0008052 | 1/2007 |
| KR | 10-2008-0019793 | 3/2008 |
| KR | 10-2008-0114326 | 12/2008 |
| KR | 10-2009-0037661 | 4/2009 |
| KR | 10-2015-0017973 | 2/2015 |
| KR | 10-2018-0065592 | 6/2018 |
| KR | 10-2018-0103504 | 9/2018 |
| KR | 10-1951326 | 2/2019 |
| KR | 10-2019-0060466 | 6/2019 |
| KR | 10-2019-0073760 | 6/2019 |

OTHER PUBLICATIONS

Written Opinion of the ISA for PCT/KR2021/001982 dated Jun. 11, 2021, 4 pages.

* cited by examiner

ELECTRONIC DEVICE AND CONTROL METHOD THEREOF

CROSS-REFERENCE TO RELATED APPLICATIONS

This application is a continuation of International Application No. PCT/KR2021/001982 filed on Feb. 16, 2021, designating the United States, in the Korean Intellectual Property Receiving Office, and claiming priority to Korean Patent Application No. 10-2020-0050223, filed on Apr. 24, 2020, in the Korean Intellectual Property Office, the disclosures of which are all hereby incorporated by reference herein in their entireties.

BACKGROUND

Field

Certain example embodiments relate to an electronic device that processes to provide a broadcast service based on a received broadcast signal, and/or a method for controlling the same.

Description of Related Art

Advanced Television Systems Committee (ATSC), one of the broadcast standards, is adopted in Korea, the United States, Canada, etc., and is in a transition period from ATSC 1.0 to ATSC 3.0. ATSC 3.0 is a next-generation broadcast standard that provides various advanced functions such as frequency division, convergence with broadband, and file transfer using NRT. Accordingly, in North America, ATSC 3.0 broadcast transmission and conversion from ATSC 1.0 are being made.

Basically, an electronic device performs a channel search for a standard frequency band according to a broadcast standard and a broadcast environment determined by each country or broadcaster, and stores the searched channel information. In addition, when a user selects a channel, frequency tuning is performed and data are received based on the stored channel information to output an image.

However, when a broadcast signal cannot be received, such as when a channel is tuned in but there is no information on the selected channel in the stored channel information, the electronic device searches all frequencies for broadcast standards or broadcast environments supported by the country, so it takes a lot of time and, during the time, the user cannot operate the electronic device. For example, if the channel search function is used, the electronic device searches all available frequency bands such as terrestrial, cable, and satellite, including the broadcast standards such as analog broadcast, ATSC 1.0, and ATSC 3.0, and the user cannot watch the broadcast during the time.

SUMMARY

Certain example embodiments provide an electronic device capable of more efficiently receiving a broadcast signal of a selected channel and/or a method for controlling the same.

An electronic device according to an example embodiment may include: an interface part comprising interface circuitry; a processor configured to: store information on a plurality of broadcast channels receivable through the interface part; receive a user input for selecting a channel number; based on the stored information on the plurality of broadcast channels, if a broadcast signal of the broadcast channel corresponding to the selected channel number according to the user input is not received, identify a broadcast standard corresponding to the selected channel number; process a frequency band of the broadcast signal corresponding to the selected channel number according to the identified broadcast standard; and control the stored information on the plurality of broadcast channels to be updated according to a result of the processing.

The processor may be configured to identify that the broadcast signal corresponding to the selected channel number is not received if there is no channel information corresponding to the selected channel number in the stored information on the plurality of broadcast channels.

The processor may be configured to identify that the broadcast signal corresponding to the selected channel number is not received if the frequency band of the broadcast signal corresponding to the selected channel number cannot be processed based on the stored information on the plurality of broadcast channels or channel information cannot be obtained from the frequency band of the broadcast signal corresponding to the selected channel number.

A broadcast environment in which the broadcasting signal corresponding to the selected channel number is received may be identified and the broadcast standard corresponding to the selected channel number may be identified from among a plurality of broadcast standards corresponding to the identified broadcast environment.

The processor may be configured to identify the broadcast environment in which the broadcast signal corresponding to the selected channel number is received based on a broadcast environment of the broadcast channel through which a broadcast service has been provided before the user input for selecting the channel number is received.

The processor may be configured to identify a region where the electronic device is installed and identify the frequency band of the broadcast signal corresponding to the selected channel number based on the identified region.

The processor may be configured to identify a second broadcast standard published later than a first broadcast standard among the plurality of broadcast standards in a manner that the second broadcast standard has priority over the first broadcast standard.

The processor may be configured to identify a user viewing history with respect to the broadcast signal and identify whether the broadcast signal of the selected channel can be received by applying a broadcast standard preferred to by a user to have priority among the plurality of broadcast standards based on the identified user viewing history.

A method of controlling an electronic device according to an example embodiment may include: storing information on a plurality of broadcast channels receivable through an interface part; receiving a user input for selecting a channel number; based on the stored information on the plurality of broadcast channels, if a broadcast signal of the broadcast channel corresponding to the selected channel number according to the user input is not received, identifying a broadcast standard corresponding to the selected channel number; processing a frequency band of the broadcast signal corresponding to the selected channel number according to the identified broadcast standard; and controlling the stored information on the plurality of broadcast channels to be updated according to a result of the processing.

The identifying the broadcast standard corresponding to the selected channel number may include identifying that the broadcast signal corresponding to the selected channel number is not received if there is no channel information corresponding to the selected channel number in the stored information on the plurality of broadcast channels.

The identifying the broadcast standard corresponding to the selected channel number may include identifying that the broadcast signal corresponding to the selected channel number is not received if the frequency band of the broadcast signal corresponding to the selected channel number cannot be processed based on the stored information on the plurality of broadcast channels or channel information cannot be obtained from the frequency band of the broadcast signal corresponding to the selected channel number.

The method may further include identifying a broadcast environment in which the broadcasting signal corresponding to the selected channel number is received, wherein the identifying the broadcast standard corresponding to the selected channel number may include identifying the broadcast standard corresponding to the selected channel number from among a plurality of broadcast standards corresponding to the identified broadcast environment.

The identifying the broadcast standard corresponding to the selected channel number may include identifying the broadcast environment in which the broadcast signal corresponding to the selected channel number is received based on a broadcast environment of the broadcast channel through which a broadcast service has been provided before the user input for selecting the channel number is received.

The identifying the broadcast environment in which the broadcasting signal corresponding to the selected channel number is received may include identifying a region where the electronic device is installed, and wherein the identifying the broadcast standard corresponding to the selected channel number may include identifying the frequency band of the broadcast signal corresponding to the selected channel number based on the identified region.

The identifying the broadcast standard corresponding to the selected channel number may include identifying a second broadcast standard published later than a first broadcast standard among the plurality of broadcast standards in a manner that the second broadcast standard has priority over the first broadcast standard.

The identifying the broadcast standard corresponding to the selected channel number may include identifying a user viewing history with respect to the broadcast signal and identifying whether the broadcast signal of the selected channel can be received by applying a broadcast standard preferred to by a user to have priority among the plurality of broadcast standards based on the identified user viewing history.

A recording medium may store a computer program including a computer-readable code to perform a method of controlling an electronic device, wherein the method may include: storing information on a plurality of broadcast channels receivable through an interface part; receiving a user input for selecting a channel number; based on the stored information on the plurality of broadcast channels, if a broadcast signal of the broadcast channel corresponding to the selected channel number according to the user input is not received, identifying a broadcast standard corresponding to the selected channel number; processing a frequency band of the broadcast signal corresponding to the selected channel number according to the identified broadcast standard; and controlling the stored information on the plurality of broadcast channels to be updated according to a result of the processing.

According to an example embodiment, when a broadcast service corresponding to a specific channel number cannot be provided, necessary or desired information can be quickly obtained and the broadcast service can be provided to the user, thereby increasing and/or improving the convenience of the user using the service.

BRIEF DESCRIPTION OF DRAWINGS

The above and other aspects, features, and advantages of certain embodiments will be more apparent from the following detailed description, taken in conjunction with the accompanying drawings, in which.

DETAILED DESCRIPTION

Figure 1:
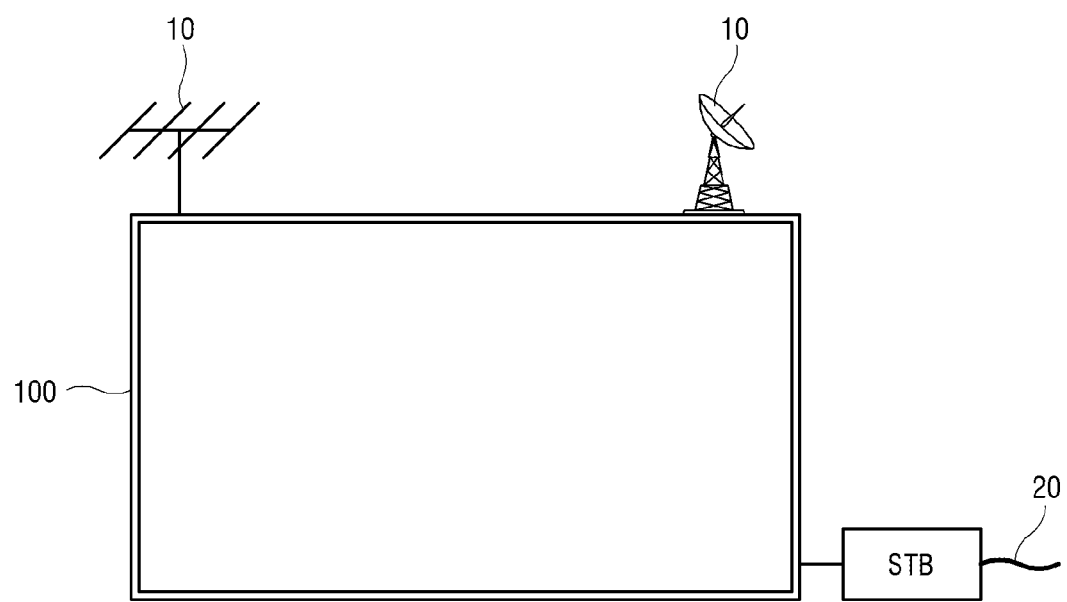
FIG. 1 is a diagram illustrating an electronic device according to an example embodiment.

Hereinafter, example embodiments will be described in detail with reference to the accompanying drawings. In the drawings, the same reference numbers or symbols refer to components that perform substantially the same function, and the size of each component in the drawings may be exaggerated for clarity and convenience of description. However, the technical spirit of the disclosure and its core configuration and operation are not limited to the configuration or operation described in the following embodiments. In describing the disclosure, if it is determined that a detailed description of a known technology or configuration related to the disclosure may unnecessarily obscure the gist of the disclosure, the detailed description thereof will be omitted.

In an example embodiment, terms including an ordinal number such as first, second, etc. are used only for the purpose of distinguishing one element from another element, and a singular expression includes a plural expression unless the context clearly indicates otherwise. In addition, in an example embodiment, terms such as 'consisting', 'comprising', 'having' and the like should be understood to be one or more other features or the presence of numbers, steps, operations, components, parts, or combinations thereof or that the possibility of addition is not excluded in advance. In addition, in an example embodiment, a 'module' or 'part' performs at least one function or operation, and may be implemented as hardware or software or a combination of hardware and software, and is integrated into at least one module. and can be implemented. Further, in an example embodiment, at least one of the plurality of elements refers to all of the plurality of elements as well as each one excluding the rest of the plurality of elements or a combination thereof. Thus, each module herein may comprise circuitry.

FIG. 1 is a diagram illustrating an electronic device according to an example embodiment. As shown in FIG. 1, the electronic device 100 may be implemented as a display device capable of receiving a broadcast signal and displaying an image. As an example, the electronic device 100 may include a TV, a computer, a smart phone, a tablet, a portable media player, a wearable device, a video wall, an electronic picture frame, and the like. However, the electronic device 100 is not necessarily limited to the display device capable of displaying the image, and for example, a device capable of processing a broadcast signal such as a set-top box may be implemented in various ways.

The electronic device 100 may receive a broadcast signal in various ways to provide a broadcast service. For example, in the case of terrestrial broadcast, a broadcast signal transmitted by a broadcast service provider such as a broadcast station may be received through an antenna 10, in the case of cable broadcast, the broadcast signal may be received through a coaxial cable 20, and in the case of satellite broadcast, the broadcast signal may be received through a satellite dish 30. Since such methods use a frequency unlike receiving a broadcast signal through the Internet network, the electronic device 100 needs to scan, that is, search a frequency band in order to provide the broadcast service. However, since it is inefficient for the electronic device 100 to perform an operation of acquiring channel information corresponding to a selected channel whenever a channel is selected, in order to improve this, the electronic device 100 may perform auto-scanning on the broadcast signal for all channels by frequency so that a service map (or a channel map) consisting of service information necessary for providing the broadcast service can be created and stored for each channel in advance. The electronic device 100 may generate and store the service map, for example, when the electronic device 100 is used for the first time or when the automatic scanning is executed by a user input. Thereafter, when receiving the broadcast signal, the electronic device 100 can quickly provide the broadcast service by identifying the information corresponding to the received broadcast signal with reference to the previously stored service map.

However, after the electronic device 100 generates and stores the service map, a service configuration in the broadcast signal may be changed by the broadcast service provider. For example, the broadcast service provider may add, delete, or change the broadcast service in a specified frequency, and may change a channel number of the broadcast service. Alternatively, relocation of the frequency bands between the broadcast service providers may occur due to a government policy or the like. In this case, the service information in the broadcast signal may not exist in the previously stored service map or may be different from the service information included in the service map. Accordingly, when the electronic device 100 tries to process a frequency band of the broadcast signal based on the previously stored service map, since the information on a channel included in the service map does not correspond to the currently received broadcast signal, the frequency band of the broadcast signal cannot be normally processed, and thus the broadcast service desired by the user cannot be provided. In this case, because it takes too much time for the electronic device 100 to search all frequency bands again to generate and store the service map and the user cannot use the electronic device 100 while the electronic device 100 performs an operation for scanning the broadcast signal, there is inconvenience to use. In addition, if the entire channels are scanned whenever the service configuration is changed, there is a problem that the system may be overloaded. Accordingly, if a user input for selecting a channel number is received but a corresponding broadcast service cannot be provided, an electronic device which is capable of receiving a broadcast signal corresponding to the selected channel number in consideration of a broadcast environment, a broadcast standard, etc. and a control method thereof are provided.

Figure 2:
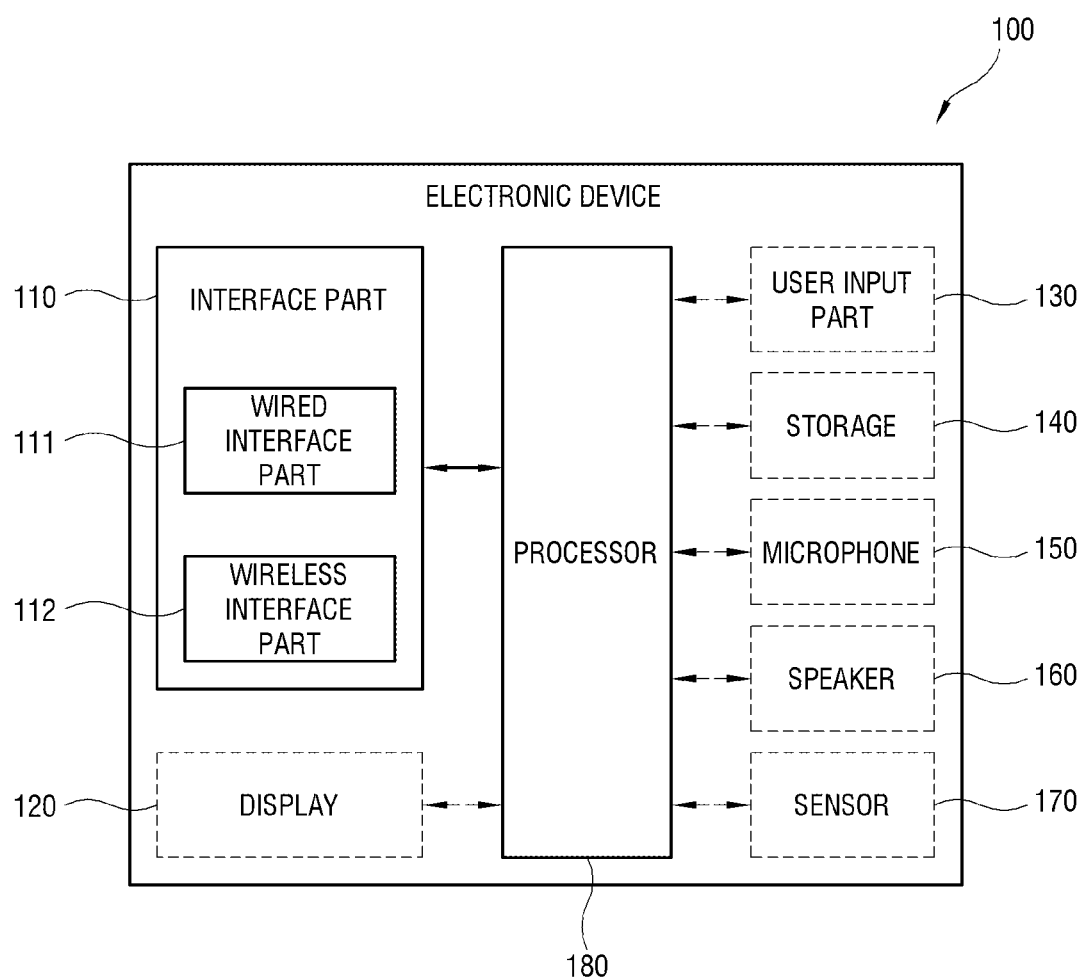
FIG. 2 is a block diagram illustrating a configuration of the electronic device according to an example embodiment.

FIG. 2 is a block diagram illustrating a configuration of the electronic device according to an example embodiment.

As shown in FIG. 2, the electronic device 100 may include an interface part 110. The interface part 110 may include a wired interface part 111. The wired interface part 111 includes a connector or port to which an antenna 10 or a satellite dish 20 capable of receiving a broadcast signal according to a broadcast standard such as terrestrial/satellite broadcast, or a cable capable of receiving a broadcast signal according to a cable broadcast standard can be connected, directly or indirectly. As another example, the electronic device 100 may have a built-in antenna capable of receiving a broadcast signal. The wired interface part 111 may include is a connector or port which conforms to video and/or audio transmission standards such as an HDMI port, DisplayPort, DVI port, Thunderbolt, composite video, component video, super video, SCART, etc. The wired interface part 111 may include a connector or port according to a universal data transmission standard such as Universal Serial Bus (USB) or the like. The wired interface part 111 may include a connector or port to which an optical cable is connected according to an optical transmission standard. The wired interface part 111 may include a connector or port to which an external microphone or an external audio device having a microphone is connected and which is capable of receiving or inputting audio signals from an audio device. The wired interface part 111 may include a connector or port to which an audio device, such as a headset, an earphone, an external speaker and the like, is connected and which is capable of receiving or inputting audio signals to the audio device. The wired interface part 111 may include a connector or port according to a network transmission standard such as Ethernet or the like. For example, the wired interface part 111 may be implemented as a local area network (LAN) card or the like, which is wired to a router or a gateway.

The wired interface part 111 may be wired in a 1:1 or 1:N (here, N is a natural number) manner with an external device or an external display device such as a set-top box, an optical media reproducing device, a speaker, a server and so on via the connector or port, and thereby may transmit and receive audio/video signals therebetween. The wired interface part 111 may include a connector or port which separately transmit the audio/video signals.

Also, according to an embodiment, the wired interface part 111 is embedded in the electronic device 100, but embodiments are not limited thereto and the wired interface part 111 may be also implemented as a dongle or module to be attached to or detached from the connector of the electronic device 100.

The interface part 110 may include a wireless interface part 112. The wireless interface part 112 may be embodied in a various manner corresponding to an embodied form of the electronic device 100. For example, the wireless interface part 112 may use, as a wireless communication method, radio frequency (RF), Zigbee, Bluetooth, Wi-Fi, ultra-wideband (UWB), near-field communication (NFC), etc. The wireless interface part 112 may be embodied as a wireless communication module for performing wireless communication with an access point (AP) according to Wi-Fi methods, a wireless communication module for performing 1:1 direct wireless communication such as Bluetooth, and so on. The wireless interface part 112 may wirelessly communicate with a server on a network, thereby transmitting and receiving data packets to and from the server. The wireless interface part 112 may include an infrared (IR) transmitter and/or an IR receiver, which can transmit and/or receive IR signals according to an IR communication standard. The wireless interface part 112 may receive or input a remote control signal from a remote controller or other external devices, or transmit or output the remote control signal to the remote controller or the other external devices, through the IR receiver and/or the IR transmitter. As another example, the electronic device 100 may transmit and receive the remote control signal to and from the remote controller or the other external devices through a wireless interfaces part 112 having a different communication standard such as Wi-Fi, Bluetooth and so on.

In a case that a video/audio signal received through the interface part 110 is a broadcast signal, the electronic device 100 may further include a tuner which tunes the received broadcast signal for each channel.

The electronic device 100 may include a display 120. The display 120 includes a display panel which can display an image on a screen. The display panel is provided with a light receiving structure such as a liquid crystal or a spontaneous emission structure such as an organic light emitting diode (OLED). The display 120 may include an additional configuration according to the structure of the display panel. For example, in a case that the display panel is a liquid crystal type, the display 120 may include a liquid crystal display panel, a backlight configured to supply light to the liquid crystal display panel, and a panel driving substrate configured to drive the liquid crystal display panel.

The electronic device 100 may include a user input part 130. The user input part 130 includes circuitry related to various types of input interfaces which are provided to receive a user input. Here, the circuitry is a closed path that allows electricity to flow from one point to another and may include various electrical components such as resistors, transistors, and/or capacitors. The user input part 130 may be configured in many different forms according to the kind of the electronic device 100. As an example, the user input part 130 may include a mechanical or electronic button, a remote controller separated from the electronic device 100, an input part in an external device connected, directly or indirectly, with the electronic device 100, a touch pad, a touch screen installed on the display 120 and so on.

The electronic device 100 may include a storage 140. The storage 140 stores digitalized data. The storage 140 includes a non-volatile storage in which data can be stored regardless of whether or not power is provided, and a volatile memory which loads data to be processed by a processor 180, comprising processing circuitry, and which loses data stored therein if power is not provided. The non-volatile storage may include a flash-memory, a hard-disc drive (HDD), a solid-state drive (SSD), a read only memory (ROM) and so on and the volatile memory may include a buffer, a random access memory (RAM) and so on.

The electronic device 100 may include a microphone 150. The microphone 150 may collect sounds of an external environment including a user voice. The microphone 150 transmits signals corresponding to the collected sounds to the processor 180. The electronic device 100 may have the microphone 150 to collect the user voice or may receive through the interface part 110 a voice signal from an external device such as a remote controller having the microphone or a smartphone. The external device may have a remote control application installed therein to control the electronic device 100 or to perform a function such as a voice recognition. If the remote control application is installed in the external device, the external device may receive the user voice, transmit and receive data to and from the electronic device 100 and control the electronic device 100 using Wi-Fi/Bluetooth or infrared. Thus, the electronic device 100 may be provided with a plurality of interfaces parts 110 which can realize the mentioned communication methods.

The electronic device 100 may include a speaker 160. The speaker 160 outputs a sound based on audio data processed by the processor 180. The speaker 160 may include a unit speaker provided to correspond to audio data of any one audio channel or a plurality of unit speakers provided to correspond to audio data of a plurality of audio channels. As another example, the speaker 160 may be provided separately from the electronic device 100. In this case, the electronic device 100 may transmit the audio data to the speaker 160 through the interface part 110.

The electronic device 100 may include a sensor 170. The sensor 170 may detect or sense a state of the electronic device 100 or a state around the electronic device 100 and transmit information about the detected state to the processor 180. The sensor 170 may include at least one of a magnet sensor, an acceleration sensor, a temperature/humidity sensor, an infrared sensor, a gyroscope sensor, a position sensor (for example, a global positioning system (GPS) sensor), a barometric pressure sensor, a proximity sensor, an RGB sensor (or illuminance sensor), but embodiments are not limited thereto. Because a function of each of the sensors can be intuitively inferred from a name thereof by a skilled person, the detailed description will be omitted.

The electronic device 100 includes the processor 180. The processor 180 includes at least one hardware processor, which is implemented as a central processing unit (CPU), a chipset, a buffer, a circuit and/or so on, mounted on a printed circuit board. The processor may be implemented as a system on chip (SOC) according to a design method. In a case that the processor 180 is embodied as a display device, the processor 180 may include modules corresponding to various processes such as a demultiplexer, a decoder, a scaler, an audio digital signal processor (DSP), an amplifier and so on. Here, some or all of these modules may be implemented as the SOC. For example, the modules related to image processing such as the demultiplexer, the decoder, the scaler and the like may be implemented as an image processing SOC and the audio DSP may be implemented as a chipset separate from the SOC.

When a voice signal corresponding to a user voice is acquired through the microphone 150, etc., the processor 180 may convert the acquired voice signal into voice data. Here, the voice data may be text data obtained through a speech-to-text (STT) process which converts the voice signal into the text data. The processor 180 may identify a command represented by the voice data and perform an operation according to the identified command. Both the voice data process and the command identifying and performing process may be performed in the electronic device 100. However, in this case, because a system load and a storage capacity required to the electronic device 100 become large relatively, at least a part of the processes may be performed by at least one server which is communicably connected to the electronic device 100 through the network.

The processor 180 according to an embodiment may call at least one command from among commands of a software stored in a storage medium, which is readable by a machine such as the electronic device 100, and execute the called at least one command. This allows a device such as the electronic device 100 to be operated to perform at least one function according to the called at least one command. The at least one command may include at least one code generated by a compiler or at least one code executable by an interpreter. The storage medium readable by the machine may be provided in a form of a non-transitory storage medium. Here, the "non-transitory" storage medium is a tangible device and refers merely to that it does not include a signal (for example, an electromagnetic wave), and this term does not distinguish between a case where data is semi-permanently stored in the storage medium and a case where data is temporarily stored therein.

Meanwhile, the processor 180 may use at least one of a machine learning algorithm, a neural network algorithm, or a deep learning algorithm as a rule based or artificial intelligence (AI) algorithm to perform at least some among a data analysis, a processing, and a result information generation for storing information on a plurality of broadcast channels receivable through the interface part 110, receiving a user input for selecting a channel number, based on the stored information, if a broadcast signal of the channel corresponding to the selected channel number according to the user input is not received, identifying a broadcast standard corresponding to the selected channel number, processing a frequency band of the broadcast signal corresponding to the selected channel number according to the identified broadcast standard, and controlling the stored information on the plurality of broadcast channels to be updated according to a result of the processing.

As an example, the processor 180 may perform a function of a learning block and a function of a recognition block. The learning block may perform a function of generating a learned neural network and the recognition block may perform a function of recognizing (or, deducing, predicting, estimating and determining) data using the learned neural network. The learning block may generate or update the neural network. To generate the neural network, the learning block may obtain learning data. As an example, the learning block may obtain the learning data from the storage 140 or the outside. The learning data may be data using for learning the neural network, and teach the neural network using data that performed the operations described above as the learning data.

Prior to teaching the neural network using the learning data, the learning block may perform a preprocessing operation with respect to the obtained learning data, or select data to be used in learning among a plurality of learning data. As an example, to process in a form of data adapted to learning, the learning block may process the learning data in a predetermined format, filter the learning data, or add/remove noise into/from the learning data. The learning block may generate neural network set up to perform the operations described above using the preprocessed learning data.

The learned neural network may be configured as a plurality of neural networks (or layers). Nodes of the plurality of neural networks have weight values, and the plurality of neural network may be connected, directly or indirectly, to each other, so that an output value of one neural network is used as an input value of the other neural network. The neural networks may include, for example, models, such as convolutional neural network (CNN), deep neural network (DNN), recurrent neural network (RNN), restricted Boltzmann machine (RBM), deep belief network (DBN), bidirectional recurrent deep neural network (BRDNN) and deep Q-network.

Meanwhile, to perform the operations described above, the recognition block may obtain target data. The target data may be obtained from the storage 140 or the outside. The target data may be data, which becomes a recognition target for the neural network. Prior to applying the target data to the learned neural network, the recognition block may perform a preprocessing operation with respect to the obtained target data, or select data to be used in recognizing target data among a plurality of data. As an example, to process in a form of data adapted to recognizing, the recognition block may process the target data in a predetermined format, filter the target data, or add/remove noise into/from the target data. The recognition block may apply the preprocessed target data to the neural network, thereby obtaining an output value outputted from the neural network. The recognition block may obtain a probability value or a reliability value along with the output value.

As an example, a control method of the electronic device 100 according to an embodiment may be provided in a computer program product. The computer program product may include the commands of the software, which are executed by the processor 180, as described above. The computer program product may be traded as goods between the seller and the buyer. The computer program product may be distributed in a form of a storage medium (for example, CD-ROM) readable by the machine, or distributed (for example, downloaded or uploaded) directly on-line through an application store (for example, Play Store™) or between two user device (for example, smart phones). In a case of the on-line distribution, at least some of the computer program product may be momentarily stored or transitory generated in a storage medium readable by the machine, such as a memory in a server of a manufacturer, a server of application store, or a relay server.

Figure 3:
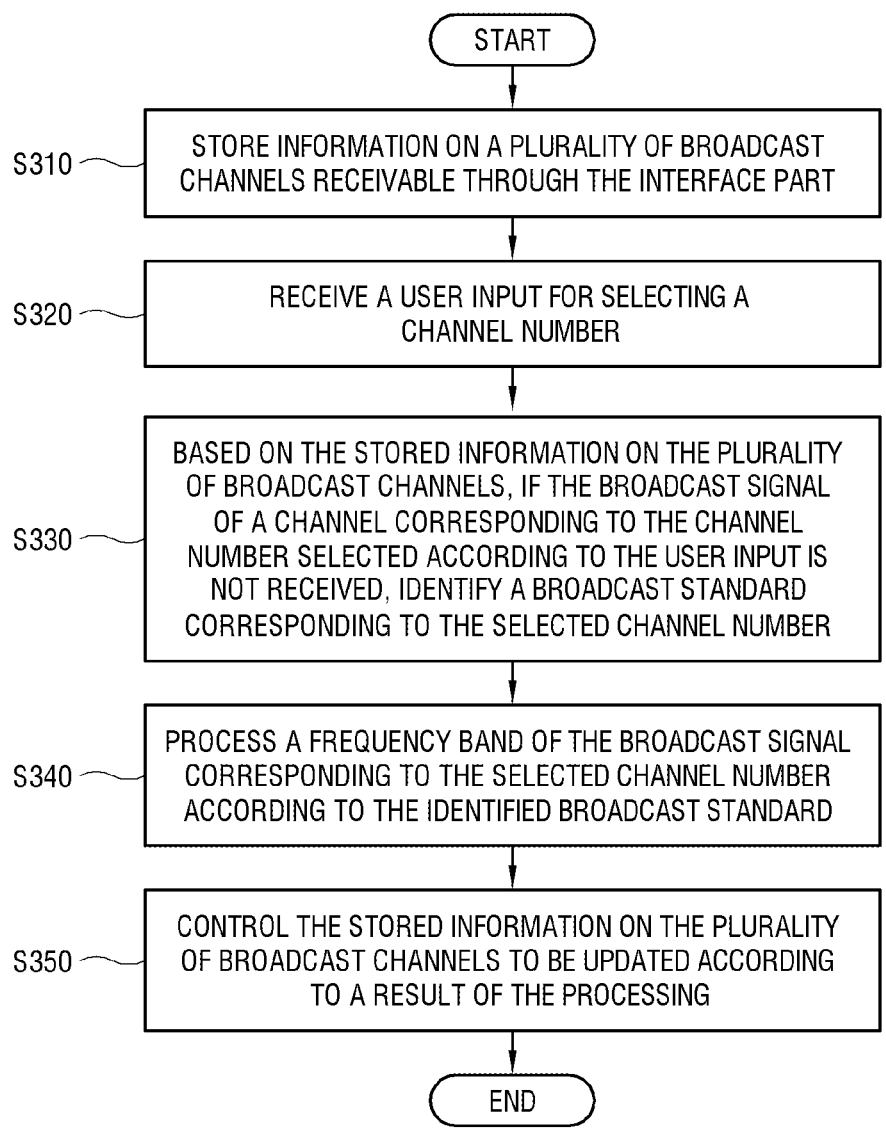
FIG. 3 is a diagram illustrating an operation flowchart of the electronic device according to an example embodiment.

FIG. 3 is a diagram illustrating an operation flowchart of the electronic device according to an example embodiment.

The processor 180 according to an example embodiment may store information on a plurality of broadcast channels receivable through the interface part 110 (S310).

The interface part 110 includes the antenna 10, the cable 20, the satellite dish 30, and the like described above with reference to FIG. 1. Accordingly, the broadcast signal receivable through the interface part 110 according to an example embodiment may refer to a signal having a frequency for terrestrial, cable, or satellite broadcast. The information on the plurality of broadcast channels according to an example embodiment includes a service map, and the service map may include various service information for receiving the broadcast signal of each channel such as a channel frequency, a broadcast service ID and signaling information.

The processor 180 receives all receivable broadcast signals through automatic scanning when performing an initial setting for providing a broadcast service of the electronic device 100 or when receiving a request for the automatic scanning through a user input, etc. The processor 180 generates the service map using information obtained according to a result of the reception and stores the service map. In this case, the service map may be stored in the storage part 140 of the electronic device 100 or be stored in an external device such as a server, but is not limited thereto.

The processor 180 may receive a user input for selecting a channel number (S320).

The processor 180 may receive a user input for directly selecting the channel number through the user input part 130 including circuitry related to various types of input interfaces, the microphone 150, the sensor 170, etc. or receive a user input for selecting the channel number through channel up or channel download, which is not limited to any one.

If the broadcast signal of a channel corresponding to the channel number selected according to the user input is not received based on the stored information on the plurality of broadcast channels, the processor 180 may identify a broadcast standard corresponding to the selected channel number (S330).

When the user input for selecting the channel number is received, the processor 180 scans the broadcast signal of the channel corresponding to the selected channel number based on the previously stored information on the plurality of broadcast channels. However, the processor 180 may identify that the broadcast signal is not received when the information on the channel corresponding to the selected channel number does not exist in the previously stored information on the plurality of broadcast channels, when a frequency band of the broadcast signal corresponding to the selected channel number cannot be processed based on the stored information on the plurality of broadcast channels or when the channel information cannot be obtained from the frequency band of the broadcast signal corresponding to the selected channel number, etc.

If the processor 180 identifies that the broadcast signal of the channel corresponding to the selected channel number is not received based on the stored information on the broadcast channels, the processor 180 may identify a broadcast standard where the broadcast signal corresponding to the selected channel number can be received. The broadcast standards are adopted differently depending on the countries, for example, ATSC in Korea, the United States, Canada, etc., Digital Video Broadcasting (DVB) in Europe, Russia, Australia, Africa, etc., Integrated Services Digital Broadcasting (ISDB) in Japan, and Digital Terrestrial Multimedia Broadcast (DTMB) in China. Among the broadcast standards, ATSC can be classified into ATSC 1.0 and ATSC 3.0 which is an evolved standard and has a different specification from ATSC 1.0. It is important to identify the broadcast standard corresponding to the selected channel number because the frequency bands for receiving the broadcast signal and methods of processing the frequency bands may be different according to the broadcast standards.

Accordingly, the processor 180 may identify a broadcast standard for receiving the broadcast signal corresponding to the selected channel number from among the plurality of broadcast standards described above. As a method of identifying the broadcast standard for receiving the broadcast signal, the processor 180 may identify whether to receive the broadcast signal of the selected channel by preferentially applying a second broadcast standard published after a first broadcast standard among the plurality of broadcast standards over the first broadcast standard. However, the disclosure is not limited thereto and details will be described below.

The processor 180 may process the frequency band of the broadcast signal corresponding to the selected channel number according to the identified broadcast standard (S340).

When the processor 180 identifies the broadcast standard corresponding to the selected channel number, for example, in a case of the identified broadcast standard being the ATSC 3.0 standard, the processor 180 may obtain the channel information by processing the frequency band of the broadcast signal corresponding to the selected channel number based on a transmission protocol according to a protocol stack 400 which will be described later in FIG. 4. If there is a plurality of identified broadcast standards, the processor 180 may identify whether a receivable broadcast signal exits by sequentially applying the plurality of broadcast standards.

The processor 180 may control the stored information on the plurality of broadcast channels to be updated according to a result of the processing (S350).

The processor 180 may process the frequency band of the broadcast signal corresponding to the selected channel number based on the updated information on the plurality of broadcast channels to output video/audio. Also, when the channel is selected again later, the broadcast service corresponding to the selected channel may be provided based on the updated information on the plurality of broadcast channels.

According to an example embodiment, if the broadcast service corresponding to a specific channel number cannot be provided when the specific channel number is selected, required service information can be obtained by identifying the broadcast standard being used and proceeding with a search only in a corresponding frequency band without the need to search for entire services so that a channel search speed can be increased. In addition, although the user cannot use the electronic device 100 while the electronic device 100 performs an operation of scanning the broadcast signal, the user does not need to search for entire frequency bands unnecessarily. Even though the automatic scanning is not available due to time, etc., information required for receiving the broadcast signal can be obtained by quickly scanning a part of the frequency bands. Therefore, it is possible to increase the convenience of the user using the service.

FIGS. 4 to 7 illustrates a transmission protocol and a process in which the transmission protocol is required where the processor 180 obtains information on a plurality of broadcast channels, that is, a service map receivable through the interface part in operations S310, S330, etc. of FIG. 3 through a protocol stack 400 and provides a broadcast service using the obtained service map. Any embodiment herein may be used in combination with any other embodiment described herein.

Figure 4:
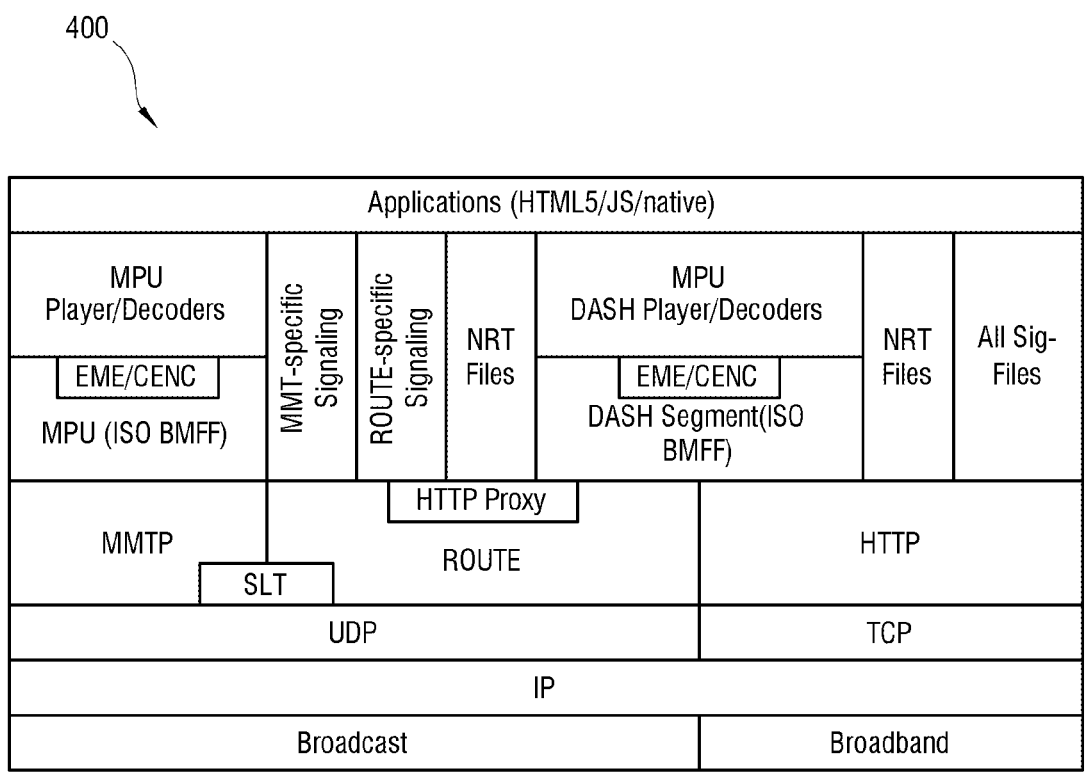
FIG. 4 is a block diagram illustrating a concept of the protocol stack according to the ATSC 3.0 standard which is referenced to by the electronic device according to an example embodiment.

FIG. 4 is a block diagram illustrating a concept of the protocol stack 400 according to the ATSC 3.0 standard, which is one of a plurality of broadcast standards which is referenced to by the electronic device according to an example embodiment.

Hereinafter, the ATSC 3.0 standard, which is one of the plurality of broadcast standards, will be described as a representative example, but the disclosure is not limited thereto.

As shown in FIG. 4, the protocol stack 400 according to the ATSC 3.0 standard shows protocols for each layer. In the ATSC 3.0 standard, a broadcast signal is transmitted by two types of media: broadcast and broadband. A broadcast signal of the broadcast type may be transmitted through a terrestrial path using an MPEG media transmission protocol (MMTP) or a real time object delivery over unidirectional transport (ROUTE) protocol. According to the MMTP, based on MPEG media transport (MMT), media processing units (MPUs) are transmitted using the MMTP. According to the ROUTE protocol, based on MPEG dynamic adaptive streaming over HTTP (DASH), a DASH segment is transmitted using the ROUTE protocol. Contents transmitted by using the MMTP or ROUTE protocol may be in real time or non-real time (NRT). These contents can be reproduced by an MPU Player or DASH Player.

A broadband broadcast signal is transmitted over the Internet according to the HTTP. In this case, information such as the DASH segment, signaling information and NRT is transmitted through the HTTP. This information is encapsulated in a link layer through TCP and IP layers and is transmitted in a physical layer through being processed for transmission.

Signaling of ATSC 3.0 is divided into low-level signaling (LLS) transmitted through predefined IP address and UDP port and service layer signaling (SLS) transmitted through the MMTP or ROUTE protocol. Information for acquiring the SLS is provided through a service list table (SLT), which is a kind of LLS, and the SLS provides information on how the physical and transport layers are transmitted in the SLT according to the transmission protocol of the broadcast service. The processor 180 of the electronic device 100 may obtain the signaling information of a broadcast service by obtaining the SLT and SLS from the broadcast signal.

The SLT includes information required for specifying and receiving the broadcast service in the broadcast signal. The processor 180 may generate the service map including information on a plurality of broadcast channels receivable by the electronic device 100 using the SLT when performing the automatic scanning of all or a part of the broadcast signal frequency. The SLT may be encapsulated through UDP and IP layers.

Hereinafter, a process in which the electronic device 100 acquires required information from the broadcast signal for generating the service map will be described.

Figure 5:
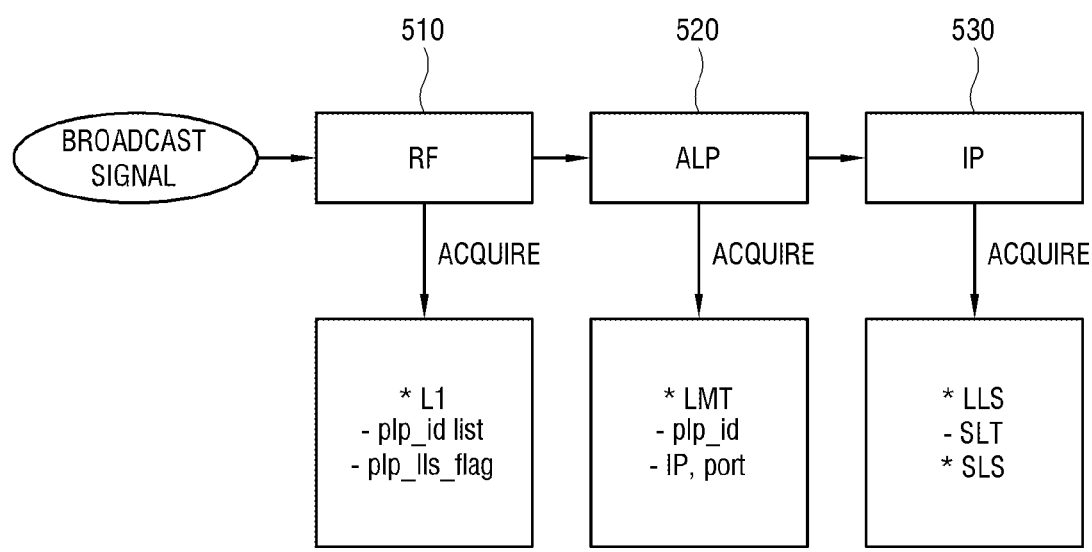
FIG. 5 is an exemplary diagram illustrating a process in which the electronic device according to an example embodiment extracts information from the broadcast signal in each processing operation.

FIG. 5 is an exemplary diagram illustrating a process in which the electronic device according to an example embodiment extracts information from the broadcast signal in each processing operation.

As shown in FIG. 5, as the processor 180 receives and tunes to the broadcast signal with a specific frequency, the processing operations upon the broadcast signal may proceed with an RF operation 510, an ATSC link layer protocol (ALP) operation 520, and an IP operation 530. Of course, as shown in the protocol stack 400 described above, a few operations may exist in the processing operations upon the broadcast signal even after the IP operation 530. The processor 180 may derive information for each operation of the broadcast signal and finally provide the broadcast service based on this information.

The broadcast signal includes one or more physical layer pipes (PLPs) for each frequency. With the physical layer of a unit frequency being regarded as one frame, the PLP corresponds to a subframe within the frame. Or, the PLP may be regarded as a kind of transmission pipeline or path through which data of the broadcast service should be transmitted. A specific port and an IP address are assigned to the PLP and a specific broadcast service is received by the electronic device through the PLP. A single PLP may not transmit only a single broadcast service but also transmit a plurality of broadcast services or, conversely, a plurality of PLPs may transmit a single broadcast service. A physical layer standard of ATSC 3.0 can support up to 64 PLPs.

The processor 180 may acquire L1 data from the broadcast signal in the RF operation 510. The L1 data includes a list of plp_ids, which are IDs of the PLPs included in the broadcast signal, and plp_lls_flag indicating which PLP includes the SLT among the all PLPs. That is, through the L1 data, the processor 180 may identify information on how many PLPs are included in a frequency of the broadcast signal, ID information of each PLP included in the frequency, and flag information on an ID of the PLP including the SLT among the PLPs, etc. For example, the PLP of plp_id indicating [plp_lls_flag=true] indicates that the PLP includes the SLT and the PLP of the plp_id indicating [plp_lls_flag=false] indicates that the PLP does not include the SLT.

The processor 180 may acquire a link mapping table (LMT) from the broadcast signal in the ALP operation 520. In order for the processor 180 to receive the broadcast service through the PLP, specific port and IP address must be allocated to the PLP. This allocation operation is called port mapping. The LMT stores information required for the port mapping and includes information on the ID of PLP and the IP address and port number allocated thereto.

The processor 180 may acquire the LLS and SLS from the broadcast signal in the IP operation 530. Since the LLS includes the SLT, the electronic device may acquire the SLT in the IP operation 530. The LLS, SLS and SLT are the same as described in the previous embodiment.

When a broadcast signal is received, the processor 180 may identify a list of IDs of PLPs in the broadcast signal and an ID of the PLP including the SLT from among all the PLPs, based on the L1 data acquired in the RF operation 510. Next, the processor 180 may enable reception of a broadcast service through the PLP by allocating an IP and a port to each PLP based on the LMT obtained in the ALP operation 520. Next, the processor 180 may acquire the SLT from the PLP indicated by the L1 data acquired in the previous RF operation 510 and configure a service map based on the SLT acquired in the IP operation 530.

Hereinafter, a form of the service map will be described.

Figure 6:
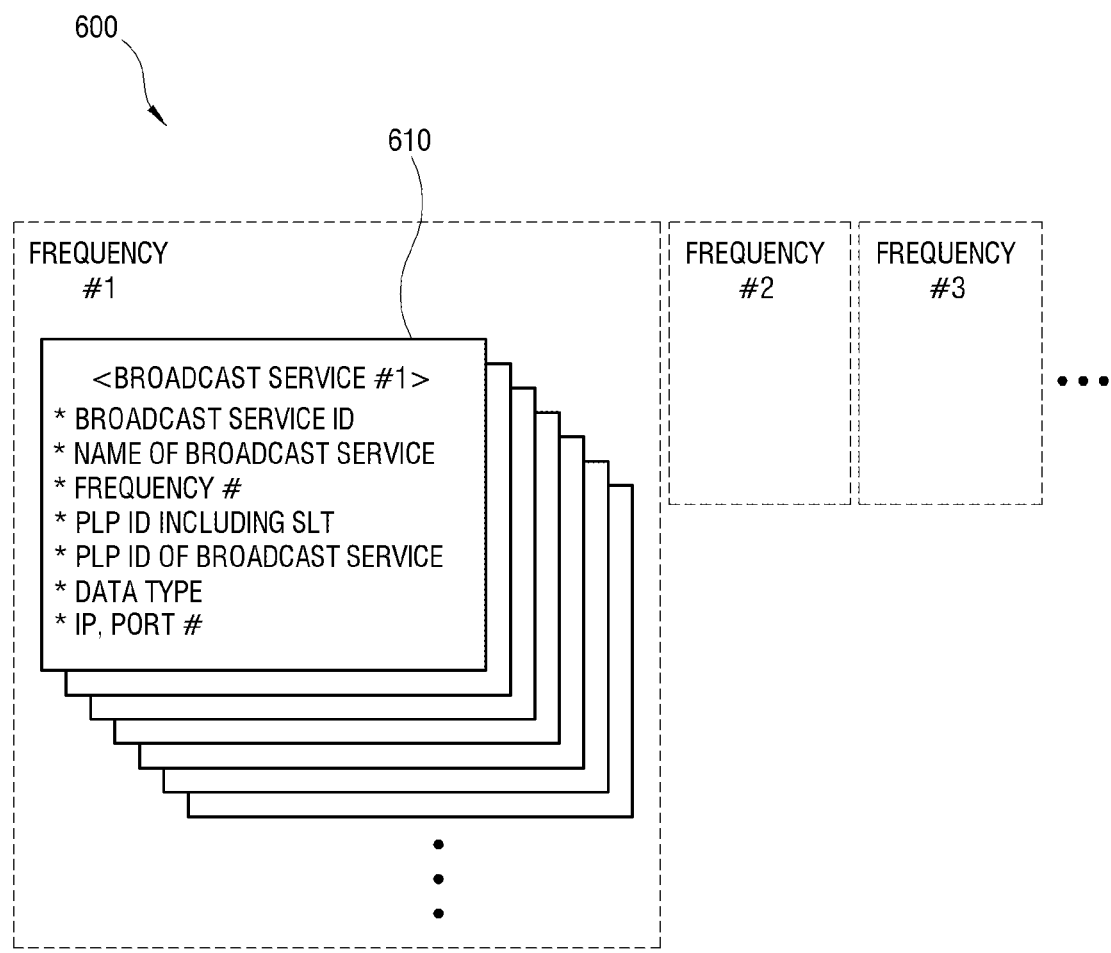
FIG. 6 is an exemplary diagram illustrating a form of a service map referred to by the electronic device according to an example embodiment.

FIG. 6 is an exemplary diagram illustrating a specific content of the service map generated by the electronic device according to an example embodiment.

As shown in FIG. 6, the processor 180 may generate and store a service map 600 through, for example, automatic scanning of all effective frequencies of a broadcast signal in an initial setting process. Here, the effective frequency refers to a frequency within a band allowed to be used by the broadcast signal. The broadcast signal includes a unit frequency allocated to each broadcast service provider such as a broadcast station and one or more broadcast services included in each unit frequency. The service map 600 is also formed by reflecting this service configuration of the broadcast signal.

The service map 600 is composed of broadcast service information 610 corresponding to an individual broadcast service as a basic unit. The broadcast service information 610 is tuning information of the broadcast signal for providing a specific broadcast service and includes signaling information of the broadcast signal of a channel corresponding to the broadcast service. As described above, the broadcast service information 610 is generated based on information obtained by the electronic device from the LMT, SLT, etc.

Since one unit frequency may provide a plurality of broadcast services, a plurality of broadcast service information 610 may be included for each frequency. The specific frequency #1 is described in the service map 600, but a common principle may be applied to other frequencies such as frequencies #2 and #3.

The broadcast service information 610 corresponding to a specific broadcast service generally includes the following information. The broadcast service information 610 includes information on an ID and a name of the broadcast service, a frequency number or ID of a channel through which the broadcast service is provided, an ID of a PLP including the SLT corresponding to the broadcast service, an ID of a PLP through which the broadcast service is provided, a data type of the broadcast service, and an IP and a port number of the required PLP, etc.

In the broadcast service information 610, the signaling information, that is, information such as the ID of the PLP including the SLT corresponding to the broadcast service, the ID of the PLP providing the broadcast service and the IP and port number of the required PLP may be acquired from the SLT or LMT. When the processor 180 processes a frequency band of the broadcast signal based on the previously stored service map 600, if the service configuration of the currently received broadcast signal is different from the service map 600, the electronic device cannot properly process the frequency band of the broadcast signal corresponding to the designated broadcast service.

Hereinafter, a method of acquiring, from the broadcast signal, data of the broadcast service corresponding to a channel designated by a user based on the signaling information such as the SLT and LMT will be described.

Figure 7:
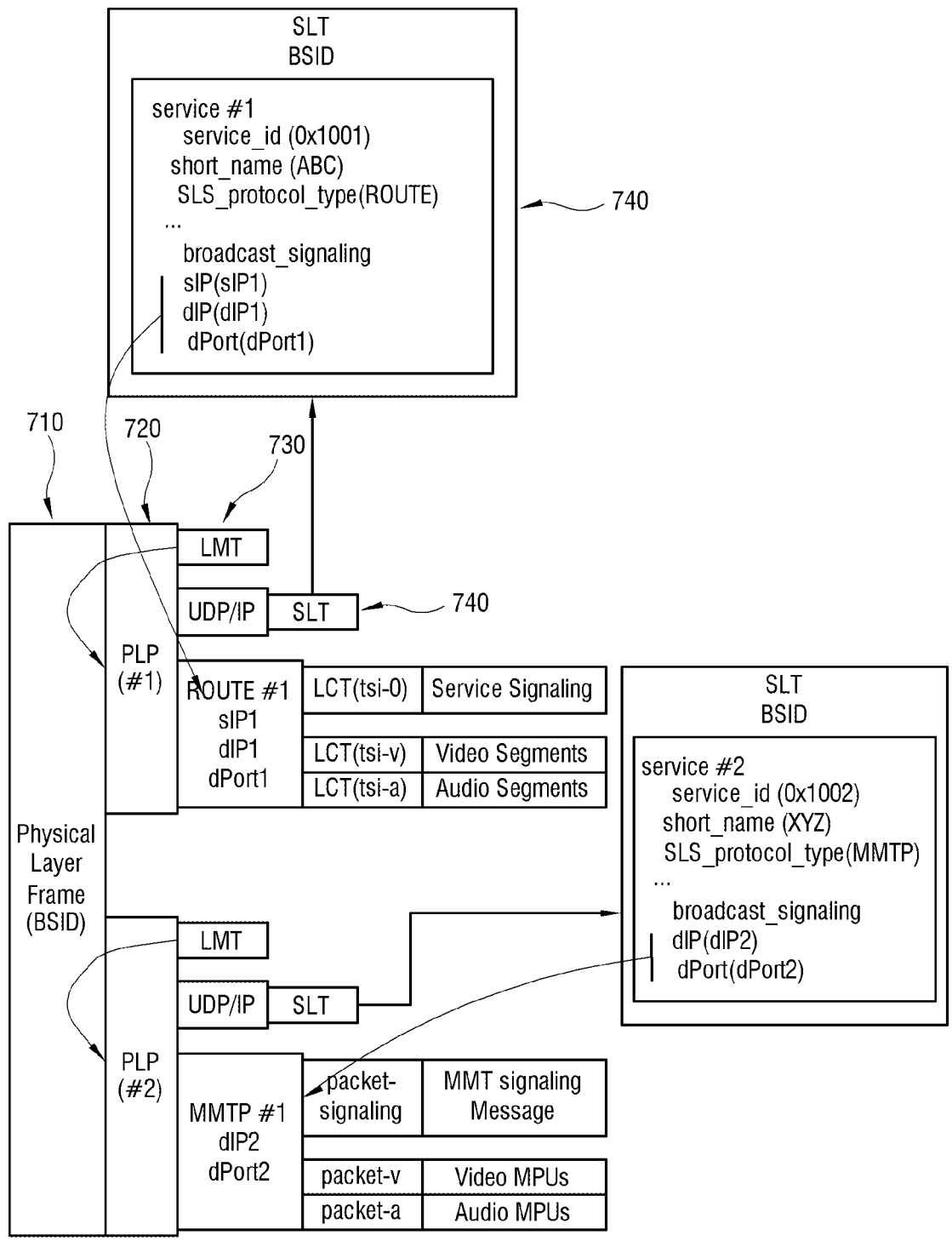
FIG. 7 is a block diagram illustrating a process in which the electronic device derives a broadcast service based on signaling information according to an example embodiment.

FIG. 7 is a block diagram illustrating a process in which the electronic device derives the broadcast service based on the signaling information according to an example embodiment.

As shown in FIG. 7, a physical layer 710 of a frequency of the broadcast signal includes a plurality of PLPs 720. The processor 180 may identify the plurality of PLPs 720 in the physical layer 710 based on the L1 and allocate IPs and ports to the PLPs 720 based on an LMT 730.

The LMT 730 and an SLT 740 may be included in the same PLP 720 as the broadcast service or be included in a different PLP 720 of the broadcast service. In addition, a plurality of SLTs 740 in which different broadcast services are described within a frequency may exist in a plurality of PLPs 720.

When the processor 180 acquires the SLT 740 from the PLP 720 indicated by flag information of the L1, the processor 180 may identify in which PLP 720 the broadcast service is present based on the information recorded in the SLT 740. For example, the processor 180 may determine the content of the broadcast service received through the PLP 720 according to the information of the SLT 740. The processor 180 may determine, based on the SLT 740, what the broadcast service received through the PLP 720 is, through which of the ROUTE and MMTP protocols the broadcast service is transmitted, and whether the data type of the broadcast service is video, audio, or both video and audio, etc. That is, the processor 180 may tune to the broadcast signal of the designated channel based on the signaling information such as the LMT 730 and SLT 740.

Figure 8:
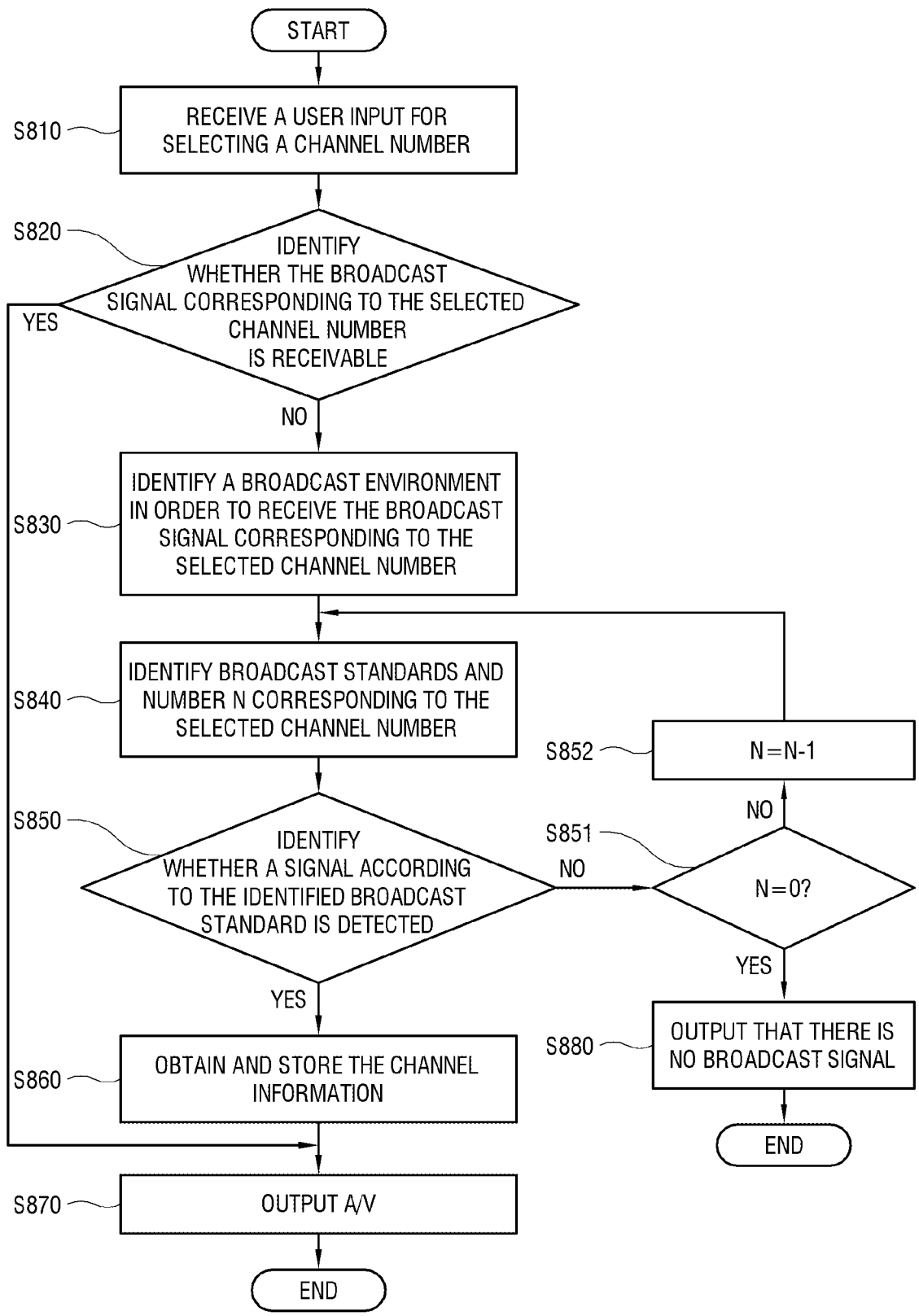
FIG. 8 is a diagram illustrating an operation flowchart of the electronic device according to an example embodiment.

FIG. 8 is a diagram illustrating an operation flowchart of the electronic device according to an example embodiment.

When the processor 180 receives a user input for selecting a channel number (S810), the processor 180 may identify whether the broadcast signal corresponding to the selected channel number is receivable (S820). If the broadcast signal corresponding to the selected channel number can be received (Yes in S820), the processor 180 may output audio/video (A/V) based on the received broadcast signal (S870). As in FIG. 3, the process of providing the broadcast service using the service map obtained by the processor 180 using the transport protocol and the physical layer according to the protocol stack 400 described in FIGS. 4 to 7 may be applied.

A case in which the processor 180 cannot receive the broadcast signal corresponding to the selected channel number (No in S820) may correspond to, as described above, that there is no channel information corresponding to the selected channel number in the service map for the previously stored plurality of broadcast channels, that the frequency band of the broadcast signal corresponding to the selected channel number cannot be processed based on the service map, or that the channel information cannot be obtained from the frequency band of the broadcast signal corresponding to the selected channel number, etc. More details regarding the operation S820 will be described with reference to FIG. 9.

The processor 180 may identify a broadcast environment in order to receive the broadcast signal corresponding to the selected channel number (S830). As one of the methods for identifying the broadcast environment, the processor 180 identifies the broadcast environment for receiving the broadcast signal based on a broadcast environment of a channel through which the broadcast service is provided before receiving the user input for selecting the channel number. For example, if the user selects a second channel while the electronic device 100 outputs the video/audio by the broadcast service of a first channel but the broadcast signal of the second channel is not received, the broadcast environment of the first channel may be identified.

More specifically, it is assumed that, as the broadcast environment of the first channel, the broadcast of the first channel is the terrestrial broadcast and is received according to the ATSC 1.0 standard. If the processor 180 receives the user input for selecting the second channel but cannot provide the broadcast service, the processor 180 may identify that the broadcast of the first channel through which the broadcast service has been provided before selecting the second channel is the terrestrial broadcast and is received according to the ATSC 1.0 standard. Accordingly, the processor 180 may process the frequency band of the broadcast signal corresponding to the number of the second channel according to the ATSC 1.0 standard.

Alternatively, as another example embodiment, it is supposed that the processor 180 identifies the frequency band of the broadcast signal corresponding to the number of the second channel based on the ATSC 1.0 standard, which is the broadcast standard of the first channel, but cannot receive the broadcast signal. In this case, the processor 180 may identify the broadcast environment of the first channel and, based on the identified broadcast environment being the terrestrial broadcast, process the frequency band of the broadcast signal corresponding to the number of the second channel according to the ATSC 3.0 standard which is another standard supporting the terrestrial broadcast.

Next, the processor 180 may identify broadcast standards capable of receiving the broadcast signal corresponding to the selected channel number and a number N thereof based on the identified broadcast environment (S840). For example, it is assumed that the identified broadcast environment is the terrestrial broadcast and three broadcast standards are identified as possible broadcast standards: NTSC, ATSC 1.0, and ATSC 3.0.

In this case, a process of identifying a plurality of broadcast standards corresponding to the identified broadcast environment will be described in more detail with reference to FIG. 10 below. Hereinafter, this example will be described.

The processor 180 may identify whether a signal according to the identified broadcast standard is detected (S850). Accordingly, the processor 180 may identify whether a signal according to any one of the three broadcast standards is detected. As to which of the three broadcast standards is selected first, the processor 180 may apply a second broadcast standard published later than a first broadcast standard among the plurality of broadcast standards in a manner that the second broadcast standard has priority over the first broadcast standard and identify whether to receive the broadcast signal of the selected channel.

For example, the first broadcast standard is ATSC 1.0 and the second broadcast standard is ATSC 3.0. ATSC 3.0 is a higher level standard than ATSC 1.0 where although ATSC 1.0 can provide DTV (Digital Television) broadcast, ATSC 3.0 can provide higher picture quality and Ultra High Definition (UHD) broadcast. In countries where ATSC is adopted as a standard, the ATSC 3.0 standard is becoming more common. Also, because when providing the broadcast service, ATSC 3.0 with good specifications is more likely to be provided, priority may be given among the broadcast standards to identify whether to receive the broadcast signal. Accordingly, regarding the three standards for detecting the broadcast signal, the processor 180 may identify whether to detect the broadcast signal sequentially based on an algorithm of operations S840, S850, S851 and S852. For example, the processor 180 first identifies based on ATSC 3.0. Then, if the broadcast signal is not searched (No in S850), the processor 180 may identify whether the number of broadcast standards N is 0, that is, whether no broadcast signal is detected for all the identified broadcast standards (S851). Since the broadcast standards which are currently identifiable are three (No in S851), the number of broadcast standards N is reduced from three to two (S852). Then, returning to the operation S840 again, through the same process, the processor 180 may identify with reference to ATSC 1.0 and NTSC which have a next priority. However, this is only an example and the disclosure may be applied based on various embodiments such as not giving priority in using the plurality of broadcast standards or giving priority with other criteria. For example, the processor 180 may identify a user viewing history for the broadcast signal and apply a user preferred broadcast standard with priority among the plurality of broadcast standards based on the identified user viewing history so as to identify whether to receive the broadcast signal of the selected channel.

If the detection operation has been done through all broadcast standards but no broadcast signal has been detected (Yes in S851), the processor 180 may output that there is no broadcast signal corresponding to the selected channel number and not provide a broadcast service (S880). For example, the processor 180 may output that there is no broadcast signal on the display 120 of the electronic device 100 so that the user can recognize that.

If a signal is detected according to any one broadcast standard (Yes in S850), the processor 180 may obtain and store the channel information corresponding to the selected channel (S860). In order to obtain the channel information corresponding to the selected channel, for example, in a case of conforming to the ATSC 3.0 standard, a location including the channel information corresponding to the selected channel may be identified by using the transport protocol and the physical layer according to the protocol stack 400 described above with reference to FIGS. 4 to 7 and the channel information may be obtained based on the SLT obtained from the identified location. The processor 180 may control to receive the broadcast signal corresponding to the selected channel number based on the obtained information. The processor 180 may receive the broadcast signal, tune to the broadcast signal and output A/V to the display.

According to an example embodiment, when receiving a user input for selecting a channel number, the electronic device merely selects a broadcast standard suitable for a broadcast environment and tunes to a frequency band corresponding thereto so that quick channel search can be done even though the broadcast signal cannot be received by using previously stored information.

Figure 9:
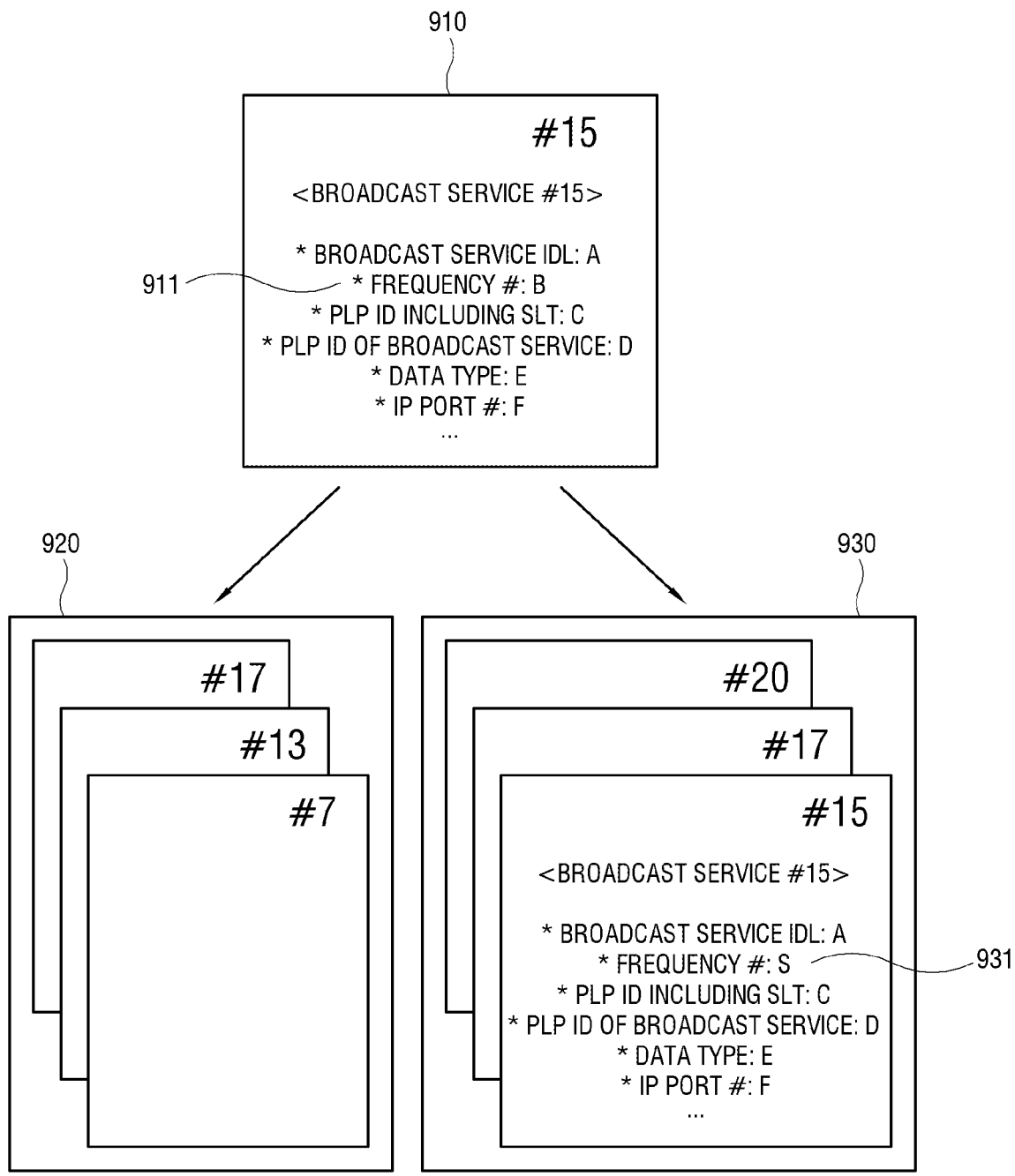
FIG. 9 is a diagram illustrating a table indicating a broadcast environment according to an example embodiment.

FIG. 9 is a diagram illustrating an operation of the electronic device according to an example embodiment. As previously shown in the operation S820 of FIG. 8, the processor 180 identifies whether the broadcast signal of the channel corresponding to the selected channel number can be received. As shown in FIG. 9, the processor 180 identifies whether the broadcast signal of the channel corresponding to the selected channel number can be received based on a stored service map.

For example, it is assumed that the user selects channel 15 to be currently received where the broadcast signal of the channel number 15 can be received and tuned to based on information such as a service map1 910, etc. Service map1 910, service map2 920 and service map3 930 illustrated in FIG. 9 may be the service map described with reference to FIGS. 4 to 6. It is assumed that the processor 180 is in a state where the service map2 920 and the service map3 930 have been received and stored in advance in two different situations respectively. First, when the service map 2 920 is received and stored, the processor 180 may identify that only channel numbers 7, 13 and 17 exist in the service map2 920 and there is no information corresponding to the channel number 15. Accordingly, since there is no information corresponding to the channel number 15 at the current stage, the processor 180 may identify that the broadcast signal corresponding to the channel number 15 is not received. In this case, as described above, the processor 180 may receive the broadcast signal again by newly identifying the broadcast environment or the broadcast standard.

In another case, when the service map3 930 is received and stored, the processor 180 may identify that the channel number 15 exists in the service map3 930. However, there may be a case in which the processor 180 cannot tune to the signal corresponding to the channel number 15 or cannot acquire data of the channel number 15 based on the service map3 930 corresponding to the channel number 15. For example, the service map may include a broadcast service ID, a frequency band, a PLP ID included in the SLT, a PLP ID of a broadcast service, a type of data, an IP port, etc., which should match information corresponding to the channel number to be actually received. However, if some of the information is changed due to the frequency relocation or change in the broadcast information described above, it is not possible to tune to the signal corresponding to the channel number to be received. In FIG. 9, although the information corresponding to the selected channel number 15 exists in the previously stored service map3 930, the frequency number 911 of the service map1 910 is B, while the frequency number 931 of the service map3 930 is changed into C. Accordingly, the broadcast cannot be received. In this case, the processor 180 may identify that the broadcast signal corresponding to the selected channel number is not received. Also in this case, as in the previous case, the processor 180 may receive the broadcast signal again by newly identifying the broadcast environment or the broadcast standard.

Figure 10:
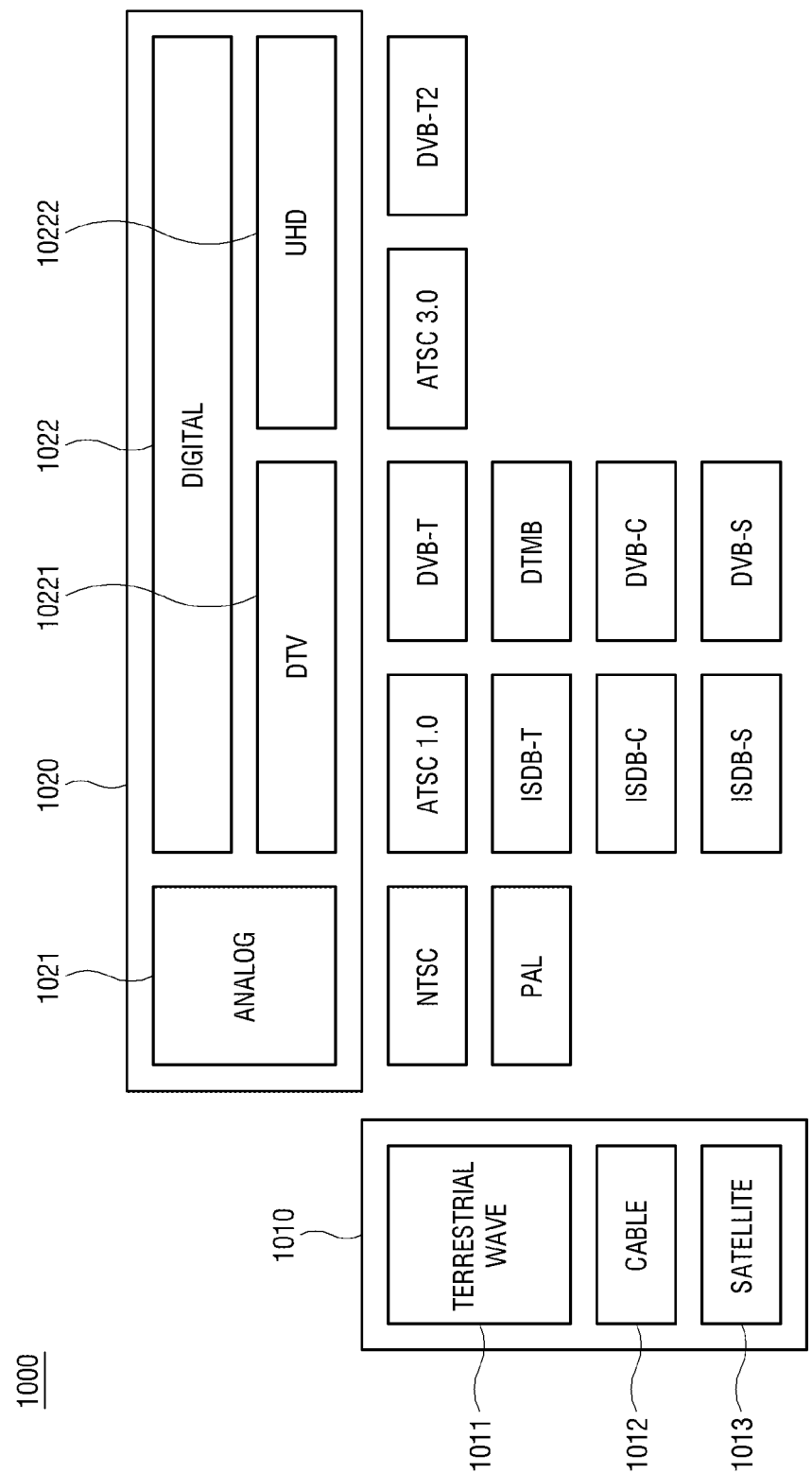
FIG. 10 is a diagram illustrating a table indicating a broadcast standard according to a broadcast environment according to an example embodiment.

FIG. 10 is a diagram illustrating a table 1000 indicating the broadcast standard according to the broadcast environment according to an example embodiment. As previously shown in S830 of FIG. 8, if the broadcast signal corresponding to the selected channel number cannot be received, the processor 180 may identify the broadcast environment corresponding to the selected channel number. In addition, as shown in S840 of FIG. 8, when the broadcast environment for receiving the broadcast signal corresponding to the selected channel number is identified, the processor 180 may identify the broadcast environment corresponding to the selected channel number from among a plurality of broadcast standards corresponding to the identified broadcast environment. The broadcast environment may exist in various ways and be a type of the broadcast signal currently received by the electronic device 100. For example, the broadcast may have different frequency bands depending on whether to be the terrestrial broadcast, cable broadcast, or satellite broadcast. As to the terrestrial broadcast, the National Television System(s) Committee (NTSC) which is a broadcast standard of analog broadcast may vary depending on the type of broadcast and the viewing environment such as a service which is now provided only in a region. For example, the terrestrial broadcast may be received according to the NTSC, ATSC 1.0 and ATSC 3.0 standards and the cable broadcast may be received according to Open Cable and DVB-C standards.

Specifically, as shown in FIG. 10, in a case of broadcast environmen1 1010, there exist a terrestrial wave 1011, a cable 1012 and a satellite 1013 as a kind according to a broadcast reception method. In a case of broadcast environment2 1020, there exist an analog 1021 and a digital 1022 as a broadcast transmission method. There are broadcast standards according to each category. In a case where the broadcast is received by the terrestrial wave 1011 and is transmitted in the analog 1021 method, there are the NTSC and PAL as the broadcast standard. In a case where the broadcast is received by the terrestrial wave 1011 and is transmitted in the digital 1022 method, the broadcast can be divided into a general digital TV 10221 or a UHD 10222 having high resolution according to a version of the broadcast standard. As the broadcast standard where the broadcast is the terrestrial wave 1011 and the DTV 10221 of the digital 1022, there exist ATSC 1.0, DVB-T, ISDB-T and DTMB. As the broadcast standard where the broadcast is the terrestrial wave 1011 and the UHD 10222 of the digital 1022, there exist ATSC 3.0 and DVB-T2. As the broadcast standard where the broadcast is received by the cable 1012 and is transmitted in the digital 1022 method, there exist ISDB-C and DVB-C. As the broadcast standard where the broadcast is received by the satellite 1013 and is transmitted in the digital 1022 method, there exist ISDB-S and DVB-S.

Information on such broadcast environment and broadcast standard corresponding thereto may be stored, for example, in the storage 140 shown in FIG. 2. The processor 180 may identify the broadcast environment of currently viewing and the broadcast standard corresponding thereto based on the information stored in the storage 140. The processor 180 may receive the information from the outside and update the information thereafter. The processor 180 may identify the broadcast environment based on setting information on a device environment. For example, when the user watches through the terrestrial wave, the setting information regarding the broadcast environment in the device environment may be set to the terrestrial wave and the processor 180 may identify that the current broadcast environment is the terrestrial wave. In addition, the processor 180 may obtain information on the broadcast environment from the broadcast environment of the broadcast which has been transmitted before the user input for selecting the channel number is received, and is not limited to any one example.

In addition, the broadcast environment according to an example embodiment may include a region for receiving the broadcast signal. The region includes a country where different broadcast standards are adopted for each country and, further, different frequency bands may be allocated to each region. For example, when the current broadcast environment is identified to be the terrestrial wave and a specific region, the processor 180 may identify the corresponding broadcast standard as the NTSC, ATSC 1.0 and ATSC 3.0.

Accordingly, since the broadcast standards capable of receiving the broadcast signal are different depending on the broadcast environment such as the broadcast transmission method or broadcast region, the processor 180 may identify the broadcast standard based on the broadcast environment, using the channel information acquired based on the identified broadcast standard, tune to the broadcast signal corresponding to the selected channel number and output the A/V of the selected channel.

That is, because the broadcast standard capable of receiving the broadcast signal is identified in the current broadcast environment so that the frequency band for searching the broadcast signal is determined, it is possible to search the broadcast signal more quickly.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any embodiment(s) described herein may be used in conjunction with any other embodiment(s) described herein.

What is claimed is:

1. An electronic device comprising:
   interface circuitry;
   at least one processor;
   memory storing instructions, that, when executed by the at least one processor individually or collectively, cause the electronic device to:
   store information on a plurality of broadcast channels receivable through the interface circuitry;
   receive a user input for selecting a channel number, identify from the stored information a broadcast signal of the broadcast channel corresponding to the selected channel number, and attempt to detect and receive a broadcast signal of the broadcast channel corresponding to the selected channel number;
   in response to determining, based on the stored information, that the broadcast signal of the broadcast channel corresponding to the selected channel number is not received, identify a broadcast standard corresponding to the selected channel number and process a frequency band of the broadcast signal corresponding to the selected channel number according to the identified broadcast standard; and
   control the stored information on the plurality of broadcast channels to be updated based on a result of processing the frequency band of the broadcast signal corresponding to the selected channel number according to the identified broadcast standard.

2. The electronic device according to claim 1, wherein the instructions, when executed by the at least one processor individually or collectively, cause the electronic device to identify that the broadcast signal corresponding to the selected channel number is not received when there is no channel information corresponding to the selected channel number in the stored information on the plurality of broadcast channels.

3. The electronic device according to claim 1, wherein the instructions, when executed by the at least one processor individually or collectively, cause the electronic device to identify that the broadcast signal corresponding to the selected channel number is not received when the frequency band of the broadcast signal corresponding to the selected channel number cannot be processed based on the stored information on the plurality of broadcast channels and/or channel information cannot be obtained from the frequency band of the broadcast signal corresponding to the selected channel number.

4. The electronic device according to claim 1, wherein the instructions, when executed by the at least one processor individually or collectively, cause the electronic device to identify a broadcast environment in which the broadcasting signal corresponding to the selected channel number is received and identify the broadcast standard corresponding to the selected channel number from among a plurality of broadcast standards corresponding to the identified broadcast environment.

5. The electronic device according to claim 4, wherein the instructions, when executed by the at least one processor individually or collectively, cause the electronic device to identify the broadcast environment in which the broadcast signal corresponding to the selected channel number is received based on a broadcast environment of the broadcast channel through which a broadcast service has been provided before the user input for selecting the channel number is received.

6. The electronic device according to claim 4, wherein the instructions, when executed by the at least one processor individually or collectively, cause the electronic device to identify a region where the electronic device is installed and identify the frequency band of the broadcast signal corresponding to the selected channel number based on the identified region.

7. The electronic device according to claim 4, wherein the instructions, when executed by the at least one processor individually or collectively, cause the electronic device to identify a second broadcast standard published later than a first broadcast standard among the plurality of broadcast standards in a manner that the second broadcast standard has priority over the first broadcast standard.

8. The electronic device according to claim 4, wherein the instructions, when executed by the at least one processor individually or collectively, cause the electronic device to identify a user viewing history with respect to the broadcast signal and identify whether the broadcast signal of the selected channel can be received by applying a broadcast standard preferred by a user to have priority among the plurality of broadcast standards based on the identified user viewing history.

9. A method of controlling an electronic device, the method comprising:
storing information on a plurality of broadcast channels;
receiving a user input for selecting a channel number;
identify from the stored information a broadcast signal of the broadcast channel corresponding to the selected channel number, and attempt to detect;
receive a broadcast signal of the broadcast channel corresponding to the selected channel number;
in response to determining, based on the stored information, that the broadcast signal of the broadcast channel corresponding to the selected channel number is not received, identifying a broadcast standard corresponding to the selected channel number;
processing a frequency band of the broadcast signal corresponding to the selected channel number based on the identified broadcast standard; and
controlling the stored information on the plurality of broadcast channels to be updated based on a result of the processing the frequency band of the broadcast signal corresponding to the selected channel number according to the identified broadcast standard.

10. The method according to claim 9, wherein the identifying the broadcast standard corresponding to the selected channel number comprises identifying that the broadcast signal corresponding to the selected channel number is not received when there is no channel information corresponding to the selected channel number in the stored information on the plurality of broadcast channels.

11. The method according to claim 9, wherein the identifying the broadcast standard corresponding to the selected channel number comprises identifying that the broadcast signal corresponding to the selected channel number is not received when the frequency band of the broadcast signal corresponding to the selected channel number cannot be processed based on the stored information on the plurality of broadcast channels and/or channel information cannot be obtained from the frequency band of the broadcast signal corresponding to the selected channel number.

12. The method according to claim 9, further comprising:
identifying a broadcast environment in which the broadcasting signal corresponding to the selected channel number is received,
wherein the identifying the broadcast standard corresponding to the selected channel number comprises identifying the broadcast standard corresponding to the selected channel number from among a plurality of broadcast standards corresponding to the identified broadcast environment.

13. The method according to claim 12, wherein the identifying the broadcast standard corresponding to the selected channel number comprises identifying the broadcast environment in which the broadcast signal corresponding to the selected channel number is received based on a broadcast environment of the broadcast channel through which a broadcast service has been provided before the user input for selecting the channel number is received.

14. The method according to claim 12, wherein the identifying the broadcast environment in which the broadcasting signal corresponding to the selected channel number is received comprises identifying a region where the electronic device is installed, and
wherein the identifying the broadcast standard corresponding to the selected channel number comprises identifying the frequency band of the broadcast signal corresponding to the selected channel number based on the identified region.

15. A non-transitory, computer-readable recording medium storing a computer program including a computer-readable code, which when executed causes data processing circuitry to perform a method of controlling an electronic device, the method comprising:
storing information on a plurality of broadcast channels;
receiving a user input for selecting a channel number;
identify from the stored information a broadcast signal of the broadcast channel corresponding to the selected channel number, and attempt to detect;
receive a broadcast signal of the broadcast channel corresponding to the selected channel number;
in response to determining, based on the stored information, that the broadcast signal of the broadcast channel corresponding to the selected channel number is not received, identifying a broadcast standard corresponding to the selected channel number;

processing a frequency band of the broadcast signal corresponding to the selected channel number based on the identified broadcast standard; and controlling the stored information on the plurality of broadcast channels to be updated based on a result of the processing the frequency band of the broadcast signal corresponding to the selected channel number according to the identified broadcast standard.

\* \* \* \* \*